United States Patent
Ihara et al.

(10) Patent No.: US 7,115,678 B2
(45) Date of Patent: Oct. 3, 2006

(54) FLAME-RETARDANT RESIN COMPOSITION FREE FROM HALOGEN

(75) Inventors: Toshiaki Ihara, Gunma-Ken (JP); Masaki Tanaka, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 371 days.

(21) Appl. No.: 10/144,768

(22) Filed: May 15, 2002

(65) Prior Publication Data

US 2002/0198303 A1 Dec. 26, 2002

(30) Foreign Application Priority Data

May 16, 2001 (JP) ............................. 2001-145803
Oct. 24, 2001 (JP) ............................. 2001-326197

(51) Int. Cl.
*C08K 3/22* (2006.01)
*C08K 5/54* (2006.01)

(52) U.S. Cl. ...................... 524/403; 524/265; 524/269; 524/401; 524/484; 523/205

(58) Field of Classification Search ................ 524/265, 524/267, 403, 484, 401; 523/205
See application file for complete search history.

(56) References Cited

U.S. PATENT DOCUMENTS

| | | | |
|---|---|---|---|
| 4,288,360 A | | 9/1981 | Bobear |
| 4,548,979 A | * | 10/1985 | Weise et al. ................. 524/403 |
| 4,695,597 A | * | 9/1987 | Seino ........................... 521/154 |
| 4,961,931 A | * | 10/1990 | Wong ........................... 424/430 |
| 5,296,534 A | | 3/1994 | Senuma et al. |
| 6,107,413 A | * | 8/2000 | Mori ........................... 525/342 |
| 6,281,286 B1 | * | 8/2001 | Chorvath et al. ............ 524/862 |
| 6,464,923 B1 | * | 10/2002 | Tsuji et al. .................. 264/330 |

FOREIGN PATENT DOCUMENTS

| | | | |
|---|---|---|---|
| EP | 1 059 330 | | 12/2000 |
| EP | 1 164 164 | | 12/2001 |
| EP | 1 188 794 | | 3/2002 |
| JP | 56166246 A | * | 12/1981 |
| JP | 403045638 A | * | 2/1991 |
| JP | 2000-248126 | | 9/2000 |

* cited by examiner

*Primary Examiner*—Tae H. Yoon
(74) *Attorney, Agent, or Firm*—Millen, White, Zelano & Branigan, P.C.

(57) ABSTRACT

The invention discloses a flame-retardant thermoplastic resin composition without containing any halogen compounds as a flame-retardant agent but still exhibiting excellent flame retardancy. The resin composition comprises: (a) a thermoplastic resin kneadable or moldable at a temperature lower than 250° C. such as polyethylene; (b) magnesium hydroxide as the principal flame retardant agent; (c) an organopolysiloxane compound of a specified viscosity; and (d) a reactive catalytic compound which is a radical-generating compound having an incipient thermal decomposition temperature higher than 250° C. such as 2,3-dimethyl-2,3-diphenylbutane. Alternatively, the catalytic compound as the component (d) can be a combination of a noble metal, e.g., platinum, compound and a vinyl group-containing organosiloxane compound.

20 Claims, No Drawings

FLAME-RETARDANT RESIN COMPOSITION FREE FROM HALOGEN

BACKGROUND OF THE INVENTION

The present invention relates to a novel flame-retardant resin composition free from halogen or, more particularly, relates to a novel flame-retardant thermoplastic resin composition without containing any halogen compounds but still having excellent mechanical properties and safety against pollution of environments as well as sufficiently high flame retardancy even by compounding a decreased amount of non-halogen flame-retardant agent such as metal hydroxides.

As is well known, one of the most serious problems in thermoplastic resins is the inflammability of the articles shaped or molded therefrom, which sometimes prohibit use of the resin in certain applications requiring high flame retardancy of the resin articles. While various technological proposals and attempts have been made heretofore to impart flame retardancy to thermoplastic resins, a most conventional way in this regard is to prepare a flame-retardant thermoplastic resin composition by compounding the resin with flame-retardant agents including a halogen-based compound, e.g., bromine compounds, and antimony oxide in combination. While halogen-based flame-retardant agents can impart excellent flame-retardancy to the resin composition by way of their radical-trapping activity and evolution of nonflammable gases, such halogen-containing gases are generally very toxic against human body and the damage in a fire hazard is sometimes multiplied by a large volume of such toxic gases evolved from thermoplastic resin articles containing a halogen-based flame-retardant agent. Accordingly, it is eagerly desired to develop a flame-retardant thermoplastic resin composition without formulation of a halogen-based flame-retardant agent.

A proposal recently made in this regard for polyolefin-based resin compositions, which are widely employed as an insulating material or sheath of electric wires and cables, is for the use of a metal hydroxide such as magnesium hydroxide as a non-halogen flame-retardant agent. Metal hydroxides are mostly advantageous as a flame-retardant agent in respect of their low toxicity and small volumes of smoke evolution by combustion along with little corrosiveness. The flame-retardant effect on the matrix resin thereby is exhibited by means of the water of crystallization released from the resin articles under combustion. The effect of flame retardancy exhibited by this mechanism, however, cannot be high enough and the oxygen consumption index, referred to as the OI hereinafter, can rarely exceed 25 even in a resin composition containing 100 parts by weight of a metal hydroxide powder per 100 parts by weight of the polyolefin resin.

An alternative proposal is made in Japanese Patents Nos. 2825500, 3019225 and 3072746, according to which the flame retardancy of a polyolefin resin composition can be improved without adversely affecting the mechanical properties of the resin articles by the use of a metal hydroxide powder after a surface treatment with a special surface treatment agent as the flame-retardant agent. Japanese Patent Publication 7-119324, Japanese Patent Nos. 3051211 and 3063759 and Japanese Patent Kokai 8-295784 further disclose a flame-retardant resin composition which is prepared by compounding a polyolefin resin with a specific metal hydroxide and a specific organopolysiloxane compound in combination. Each of these methods is in fact effective to improve the flame retardancy of the resin composition prepared according to the proposed formulation so that the amount of the metal hydroxide can be substantially decreased without affecting the mechanical properties of the resin articles prepared from the resin composition. The effectiveness of these methods, however, is still not high enough so that debut of a flame-retardant thermoplastic resin composition having excellent flame retardancy without a decrease in the mechanical properties is eagerly desired.

SUMMARY OF THE INVENTION

The present invention accordingly has an object to provide a novel and improved flame-retardant thermoplastic resin composition capable of exhibiting excellent flame retardancy without a decrease in the mechanical properties of the resin articles shaped from the resin composition, which is obtained without compounding any halogen-containing compounds as a flame-retardant agent.

Thus, the flame-retardant thermoplastic resin composition provided by the present invention is a uniform blend which comprises:
(a) 100 parts by weight of a thermoplastic resin kneadable or moldable, i.e. plastically deformable, at a temperature lower than 250° C.;
(b) from 50 to 300 parts by weight of a metal hydroxide powder;
(c) from 0.1 to 30 parts by weight of an organopolysiloxane compound free from aliphatic unsaturation; and
(d) a catalytically effective amount of a reactive catalyst compound, of which, in particular, the metal hydroxide as the component (b) is, preferably, magnesium hydroxide, the organopolysiloxane compound as the component (c), preferably, has gum-like consistency with a viscosity of at least 40 mm$^2$/s at 25° C. and the reactive catalyst compound as the component (d) is, preferably, (d1) a radical-generating compound having an incipient thermal decomposition temperature of 250° C. or higher such as 2,3-dimethyl-2,3-diphenyl butane or (d2) a combination of a noble metal compound and a vinyl group-containing organosiloxane compound having flowability with a relatively low viscosity.

In particular, the reactive catalytic compound as the component (d) is a complex compound of a noble metal compound, which is preferably a platinum compound, with a vinyl siloxane compound. The catalytically effective amount of the component (d) is from 0.01 to 10 parts by weight, when it is a radical-generating compound, and, when it is a noble metal complex compound, from 0.000001 to 0.1 part by weigh, calculated as the noble metal element, per 100 parts by weight of the component (a).

DETAILED DESCRIPTION OF THE PREFERRED EMBODIMENTS

As is described above, the essential ingredients comprised in the inventive flame-retardant resin composition are the components (a), (b), (c) and (d), of which the component (a) is a thermoplastic resin having specified physical properties to serve as the base ingredient of the composition. Examples of the thermoplastic resins as the component (a), from which the flame-retardant resin composition of the present invention can be prepared, include a variety of olefin-based polymeric resins and thermoplastic synthetic elastomers. The olefin-based polymeric resin is exemplified by low-density polyethylenes, high-density polyethylenes, straight-chain low-density polyethylenes, ultralow-density polyethylenes, ultrahigh molecular-weight polyethylenes, polypropylenes, polystyrenes, saponification products of ethylene/vinyl acetate copolymers, i.e. ethylene/vinyl alcohol copolymers, ethylene/ethyl (meth)acrylate copolymers, ethylene/methyl (meth)acrylate copolymers, ethylene/acrylamide copolymers, ethylene/(meth)acrylic acid copolymers, ethylene/glycidyl (meth)acrylate copolymers and ethylene/maleic anhydride copolymers as well as ionomers and the thermoplastic synthetic elastomer is exemplified by ethylene/propylene copolymeric rubbers, butyl rubbers, SBRs, NBRs, acrylic rubbers and silicone rubbers, though not particularly limitative thereto. These thermoplastic resins and elastomers can be used as the component (a) either singly or as a combination of two kinds or more according to need.

It is essential that the above described thermoplastic resins are kneadable or moldable at a temperature lower than 250° C. in consideration of the conventional molding process of these resins undertaken at a temperature of 250° C. or below. This is because, since the radical-generating compound as the component (d1) has an incipient thermal decomposition temperature of 250° C. or higher, this component can easily and uniformly be dispersed in the resin composition without causing thermal decomposition when the compounding work is conducted at 250° C. or below where the thermoplastic resin is in a softened state. The component (d) dispersed uniformly in the resin composition together with the organopolysiloxane compound as the component (c) synergistically exhibits a strong effect of flame retardancy only when the resin article is under combustion although the exact mechanism of this synergistic effect is not well understood at present. A presumable mechanism in this regard is that, when the resin article containing the components (c) and (d) in combination is brought into fire, the organopolysiloxane first migrates toward the surface layer of the article to form a surface layer rich in the content of the organopolysiloxane to prevent exudation of the molten resin onto the surface while the radical-generating compound contained in the body of the article serves to promote crosslinking of the resin which is a condition beneficial for the effect of flame retardancy.

It is a quite novel and unexpected discovery not reported in any prior art documents that a resin article shaped from a thermoplastic resin composition compounded with a metal hydroxide, an organopolysiloxane compound and a radical-generating compound as the components (a), (b), (c) and (d), respectively, may exhibit a strong flame-retardant effect. When the radical-generating compound has a thermal decomposition temperature lower than 250° C. as is the case in most organic peroxide compounds, the radical-generating compound exhibits an activity to promote crosslinking of the resin already during the compounding work of the resin composition to decrease mobility of the organopolysiloxane within the body of the article without contribution to the effect of flame-retardancy if not to mention the disadvantage due to premature hardening of the resin composition during the compounding works as well as the adverse influences caused by the residual amount of the organic peroxide or decomposition debris thereof.

The component (b) compounded in the inventive flame-retardant resin composition is a powder of a metal hydroxide to serve as a flame-retardant agent, which is preferably magnesium hydroxide although a variety of metal hydroxides including aluminum hydroxide can meet the purpose. As compared with magnesium hydroxide, aluminum hydroxide has a disadvantage because, since aluminum hydroxide releases vapor of the adsorbed water at about 250° C. in a peak vigorousness, the resin composition compounded at around this temperature sometimes contains voids due to the water vapor. The compounding amount of the metal hydroxide as the component (b) is in the range from 50 to 300 parts by weight or, preferably, from 50 to 150 parts by weight per 100 parts by weight of the thermoplastic resin as the component (a) although an amount thereof up to 300 parts by weight has no particular disadvantages. This is in great contrast to the formulation of conventional flame-retardant resin compositions compounded with a metal hydroxide in which the amount of the metal hydroxide must always be at least 50 parts by weight per 100 parts by weight of the thermoplastic resin.

The metal hydroxide powder as the component (b) is not particularly limitative relative to the granulometric properties of the particles provided that the metal hydroxide powder has good dispersibility in the matrix of the thermoplastic resin as the component (a). In this regard, it is sometimes advantageous that the powder of the metal hydroxide prior to compounding is subjected to a surface treatment with a compound selected from the group consisting of saturated or unsaturated fatty acids, silane coupling agents and organopolysiloxane compounds having a reactive functional group in the molecule. Surface treatment of a magnesium hydroxide powder with a fatty acid is particularly preferable in respect of good improvement on the flame retardancy presumably due to increased mobility of the organopolysiloxane compound as the component (c) when the resin article is under combustion.

The component (c) compounded in the inventive flame-retardant resin composition is an organopolysiloxane compound which preferably has a viscosity of 1000000 mm$^2$/s or higher or, more preferably, gum-like consistency at 25° C. It is also preferable that the organopolysiloxane compound as the component (c) is a dimethylpolysiloxane having a straightly linear molecular structure. It is more preferable that the organopolysiloxane compound as the component (c) has an average absolute molecular weight of at least 3000 calculated by making reference to known polystyrene resins. When the average molecular weight of the component (c) is too low, a decrease is caused in the mechanical properties of the articles shaped from the resin composition.

The amount of the organopolysiloxane compound as the component (c) compounded with the thermoplastic resin as the component (a) is in the range from 0.1 to 30 parts by weight or, preferably, from 0.1 to 10 parts by weight per 100 parts by weight of the component (a). It is preferable that the organopolysiloxane as the component (c) compounded in the above mentioned amount is free from aliphatic unsaturation without containing any unsaturated groups such as vinyl groups bonded to the silicon atoms as in the case of a dimethylpolysiloxane. This is in contrast to the unsaturation-functional or vinyl group-containing organopolysiloxane as a part of the component (d2) in combination with a noble metal compound to promote the activity of the noble metal compound. The high-polymeric dimethylpolysiloxane as the component (c) has a viscosity of, preferably, at least 1000000 mm$^2$/s at 25° C. while the unsaturation-functional organopolysiloxane as a part of the component (d2) has a viscosity in the range from 40 to 1000000 mm$^2$/s at 25° C.

The component (d) compounded with the above described components (a) to (c) is a reactive catalytic compound which is typically, on one hand, (d1) a radical-generating compound having an incipient thermal decomposition temperature of 250° C. or higher. Though not particularly limitative, the component (d1) of this class is preferably 2,3-dimethyl-2,3-diphenyl butane. Advantageously, this compound is not a dangerous material under regulation of Japanese Fire Service Act and has no toxicity against human body so that no problems are caused not only in the compounding works of the inventive composition but also relative to the residual content of the compound in the shaped articles of the inventive resin composition.

The compounding amount of the radical-generating compound as a class of the component (d1) in the inventive resin composition can be a catalytically effective amount or, preferably, is an amount in the range from 0.01 to 10 parts by weight per 100 parts by weight of the thermoplastic resin as the component (a). When the amount of the component (d1) is too small, the desired effect of flame retardancy on the resin composition may eventually be not obtained while, when the amount thereof is too large, a disadvantageous phenomenon of blooming is sometimes caused with appearance of a white powder on the surface of the articles shaped from the flame-retardant resin composition.

Though optional, the above described radical-generating compound as the component (d1) can be compounded in the resin composition as a combination with a crosslinking aid compound such as triallyl isocyanurate, N,N'-m-phenylene bismaleimide, 1,1,1-trimethylolpropane triacrylate, diethyleneglycol dimethacrylate and divinyl benzene. The compounding amount of this crosslinking aid is preferably in the range from 0.01 to 20 parts by weight per 100 parts by weight of the thermoplastic resin as the component (a). When the amount thereof is too small, the effects of desired improvement on the flame retardancy and mechanical properties of the shaped articles of the resin composition cannot be high enough while increase of the amount to exceed the above mentioned upper limit has no particular additional advantages.

In addition to the above described essential ingredients, i.e. components (a) to (d), it is optional that the flame-retardant thermoplastic resin composition of the invention is compounded with various kinds of known additives including antioxidants, ultraviolet absorbers, stabilizers, photostabilizers, lubricants, fillers and others each in a limited amount.

Examples of the above mentioned antioxidants usable in the inventive resin composition include 2,6-di-tert-butyl-4-methyl phenol, n-octadecyl-3-(3',5'-di-tert-butyl-4-hydroxyphenyl)propionate, tetrakis-[methylene-3-(3,5-di-tert-butyl-4-hydroxyphenyl)propionato]methane, tris(3,5-di-tert-butyl-4-hydroxybenzyl)isocyanurate, 4,4'-butylidene bis-(3-methyl-6-tert-butyl phenol), triethyleneglycol bis[3-(3-tert-butyl-4-hydroxy-5-methylphenyl)propionate], 3,9-bis{2-[3-tert-butyl-4-hydroxy-5-methylphenyl]propionyloxy]-1,1-dimethylethyl}-2,4,8,10-tetraoxaspiro[5,5]undecane, 4,4-thiobis(2-tert-butyl-5-methylphenol), 2,2-methylenebis(6-tert-butyl methylphenol), 4,4-methylenebis(2,6-di-tert-butylphenol), 1,3,5-trimethyl-2,4,6-tris(3,5-di-tert-butyl-4-hydroxybenzyl)benzene, tris(nonylphenyl)phosphite, tris(2,4-di-tert-butylphenyl)phosphite, distearylpentaerithritol phosphite, bis(2,4-di-tert-butylphenyl)pentaerithritol phosphite, bis(2,6-di-tert-butyl-4-methyl-phenyl)pentaerithritol phosphite, 2,2-methylenebis(4,6-di-tert-butylphenyl octyl phosphite, tetrakis(2,4-di-tert-butylphenyl)-4,4'-biphenylene diphosphite, dilauryl 3,3'-thio dipropionate, dimyristyl 3,3'-thio dipropionate, pentaerithritol tetrakis(3-laurylthiopropionate), 2,5,7,8-tetramethyl-2-(4,8,12-trimethyldecyl)coumaron-2-ol, 5,7-di-tert-butyl-3-(3,4-dimethylphenyl)-3H-benzofuran-2-on, 2-[1-(2-hydroxy-3,5-di-tert-pentylphenyl)ethyl]-4,6-dipentylphenyl acrylate and 2-tert-butyl-6-(3-tert-butyl-2-hydroxy-5-methylbenzyl)-4-methylphenyl acrylate.

Examples of the stabilizers mentioned above as an optional additive include various kinds of metal soaps such as lithium stearate, magnesium stearate, calcium laurate, calcium ricinolate, calcium stearate, barium laurate, barium ricinolate, barium stearate, zinc laurate, zinc ricinolate and zinc stearate, various kinds of laurate-, maleate- or mercapto-based organic tin compounds, various kinds of lead compounds such as lead stearate and tribasic lead sulfate, epoxy compounds such as epoxidated vegetable oils, phosphite compounds such as alkylaryl phosphites and trialkyl phosphites, β-diketone compounds such as dibenzoylmethane and dehydroacetic acid and polyol compounds such as sorbitol, mannitol and pentaerithritol as well as hydrotalcites and zeolites.

Examples of the ultraviolet absorbers as a further optional additive include benzotriazole compounds, benzophenone compounds, salicylate compounds, cyanoacrylate compounds, oxalic acid anilides and hindered amine compounds.

While the component (c) in the inventive resin composition is an organopolysiloxane which is preferably a high-polymeric dimethylpolysiloxane, the inventive resin composition may contain, as is mentioned before, an unsaturation-functional or vinyl group-containing organopolysiloxane compound, which serves as a part of the component (d2) of an alternative type jointly in combination with a noble metal compound, in a limited amount.

The amount of the unsaturation-functional organopolysiloxane as a part of the component (d2) is in the range from 0.001 to 9 parts by weight or, preferably, from 0.5 to 3 parts by weight per 100 parts by weight of the component (a). When the amount of this ingredient is too small, a decrease is caused in the flame retardancy of the resin article molded from the resin composition due to a low density of crosslinks to be formed by the reaction of the unsaturated functional groups when the resin article is brought under flame while, when the amount thereof is too large, distribution uniformity of the ingredients may be decreased since the vinyl group-containing organopolysiloxane is usually an oily liquid. It is preferable that the weight proportion of the vinyl group-containing organopolysiloxane as a part of the component (d2) relative to the total amount of the component (c) and the vinyl group-containing organopolysiloxane as the component (d2) is in the range from 1 to 30% by weight. When this proportion of the two types of the organopolysiloxanes is too low, deficiency in the density of the crosslinks is resulted when the resin article is brought under flame while, when this proportion is too high, a decrease is resulted in the distribution uniformity of the ingredients.

The unsaturation-functional organopolysiloxane as a part of the component (d2) should have a viscosity not exceeding 1000000 $mm^2/s$ at 25° C. When the viscosity is too high, the migration velocity of the organopolysiloxane toward the surface layer of the shaped article is disadvantageously decreased along with a problem of premature crosslink formation in the course of the compounding works of the composition or the molding works of the shaped articles resulting in a decreased value of oxygen consumption index. The content of the unsaturated functional groups in the unsaturation-functional organopolysiloxane as a part of the component (d2) should be at lease 2% by moles relative to the total molar content of functional groups. When this molar proportion is too low, the value of oxygen consumption index is decreased due to insufficient density of crosslinks not to give a fully cured film of the resin composition. The types of the functional groups bonded to the silicon atoms of the organopolysiloxane other than the unsaturation-functional groups are not particularly limitative.

When the inventive resin composition contains, in addition to the component (c), a vinyl group-containing organopolysiloxane as a part of the component (d2), the other part of the component (d2) compounded in combination therewith is a noble metal compound selected from platinum, palladium and rhodium compounds or, preferably, a platinum compound. The noble metal compound is compounded preferably in the form of a complex compound with the vinyl group-containing organopolysiloxane in order to obtain a more improved effect of flame retardancy of the articles shaped from the inventive resin composition with an increase in the oxygen consumption index (OI) by compounding the resin composition with a small amount of the noble metal compound. The compounding amount of the noble metal compound in the inventive resin composition is in the range from 0.000001 to 0.1 part by weight, calculated as the noble metal element per se, per 100 parts by weight of the component (a). When the compounded amount of the noble metal compound is too small, the desired improvement of the flame retardancy can hardly be obtained while, when the amount thereof is too large, a disadvantage due to coloring may be caused in the resin composition in addition to the economical disadvantage due to expensiveness of noble metal compounds in general.

The mechanism leading to the unexpectedly excellent flame retardancy exhibited by the inventive thermoplastic resin composition is not fully understood at present. A presumable mechanism therefor would be as follows.

When the resin composition or a shaped article thereof is brought under burning, migration of the organopolysiloxane ingredient proceeds in the first place. It would be a reasonable assumption that the unsaturation-functional organopolysiloxane compound as a part of the component (d2) causes migration at the earliest stage since this ingredient is an oily organopolysiloxane, of which the functional unsaturated groups, e.g., vinyl groups, are subject to a crosslinking reaction when the increasing temperature has reached 250° C. or higher. Accordingly, a coating film of the crosslinked organopolysiloxane is formed on the surface of the burning article. This crosslinked coating layer exhibits the effect of flame retardancy by itself and serves to hold the flame retardant layer formed below from the silica derived from the dimethylpolysiloxane and the magnesium hydroxide powder which exhibits an effect of flame retardancy by disturbing flow-out of the molten thermoplastic resin as the principal combustion source to the surface layer.

In the compounding work for the preparation of the inventive flame-retardant resin composition, the various ingredients including a thermoplastic resin, a metal hydroxide powder, an organopolysiloxane and a reactive catalytic compound together with other optional additives can be directly blended together in a double-screw extruder machine, single-screw extruder machine, Banbury mixer or pressurizable kneader under heating. It is preferable, however, in respect of the uniformity of dispersion of the compounded ingredients that a master blend is prepared in advance by omitting the metal hydroxide or by omitting the thermoplastic resin from the overall formulation and the master blend is subsequently blended with the metal hydroxide or the thermoplastic resin.

In the following, the flame-retardant thermoplastic resin composition free from halogen according to the present invention is illustrated in more detail by way of Examples and Comparative Examples, which, however, never limit the scope of the invention in any way. In the following description, the term of "parts" always refers to "parts by weight".

EXAMPLE 1

A thermoplastic resin composition was prepared by uniformly blending 100 parts of an ethylene/vinyl acetate copolymeric resin having a Vicat softening temperature of 57° C. (Evaflex 460, a product by Mitsui Du Pont Polychemical Co.), referred to as the EVA hereinafter, 100 parts of a magnesium hydroxide powder surface-treated with a fatty acid (Kisma 5B, a product by Kyowa Chemical Co.), referred to as the Kisma hereinafter, 8 parts of a dimethylpolysiloxane gum having a straightly linear molecular structure with an average molecular weight of 500000 (a product by Shin-Etsu Chemical Co.), referred to as the silicone gum hereinafter, and a combination of 2 parts of a methylvinyl silicone oil having a viscosity of 700 mm$^2$/s at 25° C. (a product by Shin-Etsu Chemical Co.) and 0.2 part of an organic solution of a platinum complex compound containing 2% by weight of a platinum compound calculated as the platinum element (Cat-PL-1, a product by Shin-Etsu Chemical Co.) in a blending machine (Laboplasto Mixer manufactured by Toyo Seiki Co.) rotating at 30 rpm for 10 minutes at 140° C.

The thus compounded thermoplastic resin composition was compression-molded by compressing for 1 minute under a pressure of 10 kgf/cm$^2$ into a 2.5 mm thick plate and 0.8 to 1.0 mm thick sheets. The 2.5 mm thick plate was subjected to the measurement of the oxygen consumption index (OI) and the 0.8 to 1.0 mm thick sheets were subjected to the measurements of the tensile strength (TS) and ultimate elongation (EI). The results are shown in Table 1 below. The OI value was measured according to JIS K7201 and the mechanical properties were measured according to JIS K7113 by using the No. 2 test specimens.

EXAMPLE 2

The experimental procedure was substantially the same as in Example 1 except that, in the formulation of the resin composition, the amounts of the Kisma was increased from 100 parts to 140 parts. The results of measurements are shown in Table 1.

EXAMPLE 3

The experimental procedure was substantially the same as in Example 1 except that, in the formulation of the resin composition, the amounts of the silicone gum was decreased from 8 parts to 7 parts and the amount of the methylvinyl silicone oil used in combination with 0.2 part of the platinum catalyst solution was increased from 2 parts to 3 parts. The results of measurements are shown in Table 1.

EXAMPLE 4

The experimental procedure was substantially the same as in Example 1 except that, in the formulation of the resin composition, the amount of the silicone gum was increased from 8 parts to 10 parts and the combination of the methylvinyl silicone oil and the platinum catalyst solution was replaced with 0.08 part of 2,3-dimethyl-2,3-diphenyl butane, of which the incipient thermal decomposition temperature was 257° C. (Nofmer BC, a product by Nippon Oil & Fat Co.). The results of measurements are shown in Table 1.

EXAMPLE 5

The experimental procedure was substantially the same as in Example 4 except that, in the formulation of the resin composition, the amount of the Nofmer BC was increased from 0.08 part to 0.2 part. The results of measurements are shown in Table 1.

COMPARATIVE EXAMPLE 1

The experimental procedure was substantially the same as in Example 1 except that the composition was prepared from 100 parts of the same EVA resin and 150 parts of the Kisma alone with omission of the other ingredients. The results of measurements are shown in Table 1.

COMPARATIVE EXAMPLE 2

The experimental procedure was substantially the same as in Example 4 excepting for omission of Nofmer BC in the formulation of the resin composition. The results of measurements are shown in Table 1.

COMPARATIVE EXAMPLE 3

The experimental procedure was substantially the same as in Comparative Example 2 except that, in the formulation of the resin composition, the silicone gum was replaced with the same amount of the same methylvinyl silicone oil as used in Example 1. The results of measurements are shown in Table 1.

COMPARATIVE EXAMPLE 4

The experimental procedure was substantially the same as in Example 5 except that, in the formulation of the resin composition, 0.2 part of Nofmer BC was replaced with the same amount of the same platinum catalyst solution as used in Example 1. The results of measurements are shown in Table 1.

COMPARATIVE EXAMPLE 5

The experimental procedure was substantially the same as in Example 1 except that, in the formulation of the resin composition, the silicone gum was omitted and the amount of the methylvinyl silicone oil was increased from 2 parts to 10 parts 1. The results of measurements are shown in Table 1.

COMPARATIVE EXAMPLE 6

The experimental procedure was substantially the same as in Example 1 except that, in the formulation of the resin composition, 2 parts of the methylvinyl silicone oil were replaced with the same amount of a high-polymeric methylvinyl silicone gum having a viscosity of 11500000 mm$^2$/s at 25° C., of which the content of the vinyl groups was 10% by moles based on the total amount of the methyl and vinyl groups. The results of measurements are shown in Table 1.

COMPARATIVE EXAMPLE 7

The experimental procedure was substantially the same as in Example 1 except that, in the formulation of the resin composition, the silicone gum was replaced with the same amount of a dimethyl silicone oil having a viscosity of 5000 mm$^2$/s at 25° C. (KF96, a product by Shin-Etsu Chemical Co.). The results of measurements are shown in Table 1.

COMPARATIVE EXAMPLE 8

The experimental procedure was substantially the same as in Example 1 except that, in the formulation of the resin composition, the amount of the silicone gum was decreased from 8 parts to 6 parts and the amount of the methylvinyl silicone oil combined with the platinum catalyst solution was increased from 2 parts to 4 parts. The results of measurements are shown in Table 1.

TABLE 1

|   | Oxygen consumption index | Tensile strength, MPa | Ultimate elongation, % |
|---|---|---|---|
| Example |  |  |  |
| 1 | 51.0 | 6.8 | 517 |
| 2 | 55.4 | 5.2 | 452 |
| 3 | 48.8 | 6.3 | 497 |
| 4 | 48.8 | 7.1 | 551 |
| 5 | 48.9 | 7.0 | 547 |
| Comparative Example |  |  |  |
| 1 | 42.5 | 5.6 | 16 |
| 2 | 45.7 | 6.4 | 344 |
| 3 | 43.0 | 5.0 | 302 |
| 4 | 43.2 | 6.2 | 350 |
| 5 | 43.5 | 5.2 | 305 |
| 6 | 45.2 | 6.4 | 295 |
| 7 | 43.1 | 4.9 | 284 |
| 8 | 45.9 | 5.8 | 471 |

What is claimed is:

1. A flame-retardant thermoplastic resin composition free from halogen as a uniform blend, comprising:
    (a) 100 parts by weight of a thermoplastic resin kneadable or moldable at a temperature lower than 250° C.;
    (b) from 50 to 300 parts by weight of a metal hydroxide powder;
    (c) from 0.1 to 30 parts by weight of a dimethylpolysiloxane; and
    (d) a reactive catalytic compound in a catalytically effective amount;
wherein the reactive catalytic compound as the component (d) is (d1) a radical-generating compound having an incipient thermal decomposition temperature of 250° C. or higher.

2. The flame-retardant thermoplastic resin composition free from halogen as claimed in claim 1, wherein the dimethylpolysiloxane as the component (c) has a viscosity of at least 1000000 mm$^2$/s at 25° C.

3. The flame-retardant thermoplastic resin composition free from halogen as claimed in claim 1, wherein the dimethylpolysiloxane as the component (c) has a straightly linear molecular structure.

4. The flame-retardant thermoplastic resin composition free from halogen as claimed in claim 1, wherein the radical-generating compound is 2,3-dimethyl-2,3-diphenylbutane.

5. The flame-retardant thermoplastic resin composition free from halogen as claimed in claim 1, wherein the amount of the metal hydroxide powder as the component (b) is in the range from 50 to 150 parts by weight per 100 parts by weight of the component (a).

6. The flame-retardant thermoplastic resin composition free from halogen as claimed in claim 1, wherein the amount of the dimethylpolysiloxane as the component (c) is in the range from 0.1 to 10 parts by weight per 100 parts by weight of the component (a).

7. The flame-retardant thermoplastic resin composition free from halogen as claimed in claim 1, wherein the amount of the radical-generating compound as the component (d) is in the range of 0.01 to 10 parts by weight.

8. The flame-retardant thermoplastic resin composition free from halogen as claimed in claim 1, wherein the thermoplastic resin as the component (a) is a homopolymer or copolymer of a monomeric olefin compound or a combination thereof with at least one non-olefinic polymer.

9. The flame-retardant thermoplastic resin composition free from halogen as claimed in claim 1, wherein the metal hydroxide powder as the component (b) is a magnesium hydroxide powder.

10. The flame-retardant thermoplastic resin composition free from halogen as claimed in claim 1, wherein the metal hydroxide powder as the component (b) consists of particles surface-treated with a surface treatment agent selected from the group consisting of saturated fatty acids, unsaturated fatty acids, silane coupling agents and organopolysiloxane compounds having reactive functional groups.

11. A composition free from halogen comprising blending:
    100 parts by weight of a thermoplastic resin kneadable or moldable at a temperature lower than 250° C.;
    50–300 parts by weight of a metal hydroxide powder;
    0.1–30 parts by weight of an organopolysiloxane compound free from aliphatic unsaturation; and
    2,3-dimethyl-2,2-diphenylbutane.

12. A flame-retardant thermoplastic resin composition free from halogen as a uniform blend, comprising:
    (a) 100 parts by weight of a thermoplastic resin kneadable or moldable at a temperature lower than 250° C.;
    (b) from 50 to 300 parts by weight of a metal hydroxide powder;
    (c) from 0.1 to 30 parts by weight of an organopolysiloxane compound free from aliphatic unsaturation; and
    (d) a reactive catalytic compound in a catalytically effective amount, wherein the reactive catalytic compound as the component (d) is (d1) a radical-generating compound having an incipient thermal decomposition temperature of 250° C. or higher.

13. The flame-retardant thermoplastic resin composition free from halogen as claimed in claim 4, wherein the amount of the metal hydroxide powder as the component (b) is in the range from 50 to 150 parts by weight per 100 parts by weight of the component (a).

14. The flame-retardant thermoplastic resin composition free from halogen as claimed in claim 4, wherein the amount of the dimethylpolysiloxane as the component (c) is in the range from 0.1 to 10 parts by weight per 100 parts by weight of the component (a).

15. The flame-retardant thermoplastic resin composition free from halogen as claimed in claim 4, wherein the amount of the radical-generating compound as the component (d) is in the range of 0.01 to 10 parts by weight.

16. The flame-retardant thermoplastic resin composition free from halogen as claimed in claim 4, wherein the thermoplastic resin as the component (a) is a homopolymer or copolymer of a monomeric olefin compound or a combination thereof with at least one non-olefinic polymer.

17. The flame-retardant thermoplastic resin composition free from halogen as claimed in claim 4, wherein the metal hydroxide powder as the component (b) is a magnesium hydroxide powder.

18. The flame-retardant thermoplastic resin composition free from halogen as claimed in claim 4, wherein the metal hydroxide powder as the component (b) consists of particles surface-treated with a surface treatment agent selected from the group consisting of saturated fatty acids, unsaturated fatty acids, silane coupling agents and organopolysiloxane compounds having reactive functional groups.

19. The flame-retardant thermoplastic resin composition free from halogen as claimed claim 1, wherein said thermoplastic resin as component (a) is selected from polypropylenes, polystyrenes, saponification products of ethylene/vinyl acetate copolymers, ethylene/vinyl alcohol copolymers, ethylene/ethyl (meth)acrylate copolymers, ethylene/methyl (meth)acrylate copolymers, ethylene/acrylamide copolymers, ethylene/(meth)acrylic acid copolymers, ethylene/glycidyl (meth)acrylate copolymers, ethylene/maleic anhydride copolymers, ethylene/propylene copolymeric rubbers, butyl rubbers, styrene-butadiene rubbers (SBRs), nitrile-butadiene rubbers (NBRs), acrylic rubbers and silicone rubbers.

20. The flame-retardant thermoplastic resin composition free from halogen as claimed in claim 1, wherein said thermoplastic resin as component (a) is an ethylene/vinyl acetate copolymer.

* * * * *